No. 11,923.
Reissued July 30, 1901.
J. COLDWELL & C. G. GILDARD.
WARP STOP MOTION FOR LOOMS.
(Application filed Oct. 3, 1900.)
2 Sheets—Sheet 1.
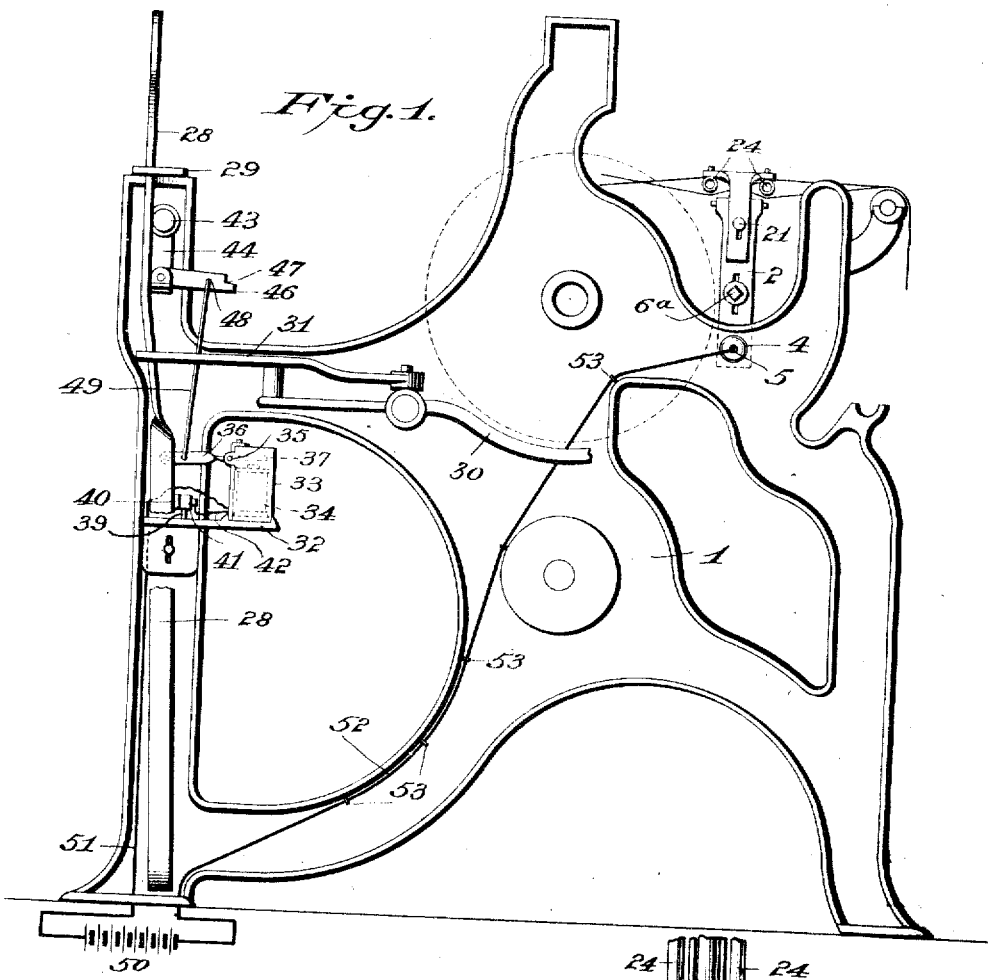
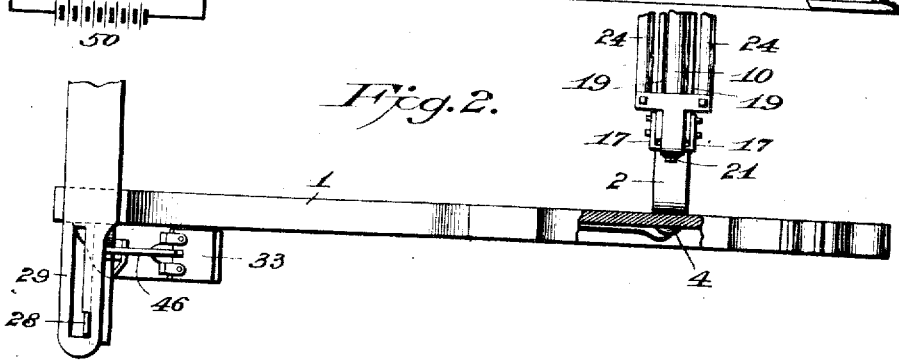
Witnesses
G. S. Elliott.
Tomas S. Beall
Inventors:
Joseph Coldwell &
C. Giles Gildard.
by W. J. Duvall Attorney No. 11,923. Reissued July 30, 1901.
J. COLDWELL & C. G. GILDARD.
WARP STOP MOTION FOR LOOMS.
(Application filed Oct. 3, 1900.)
2 Sheets—Sheet 2.
Fig. 3.
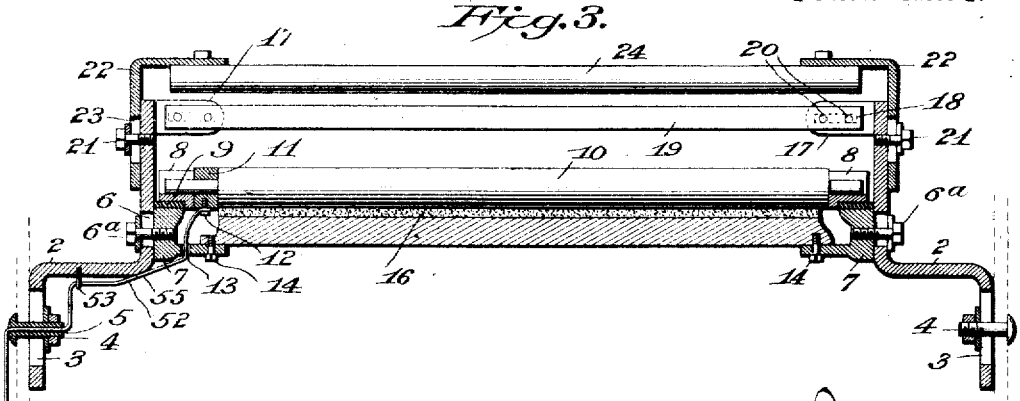
Fig. 5.
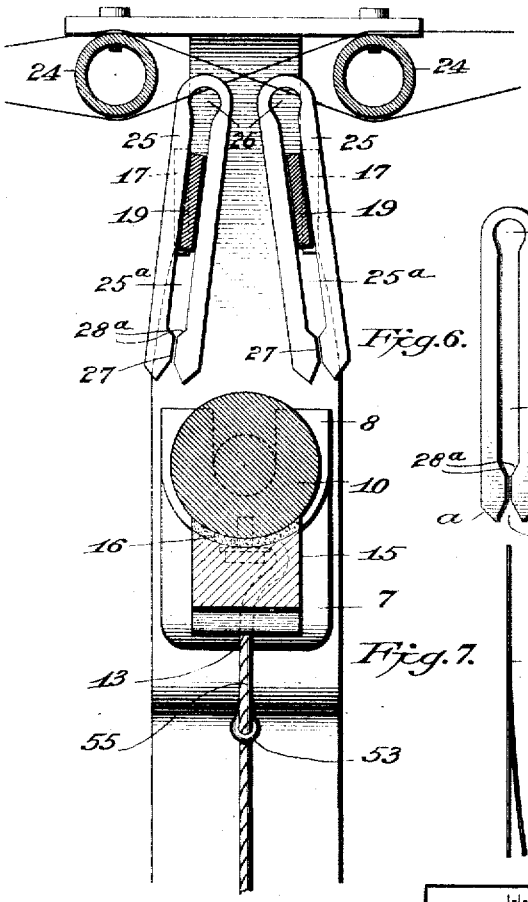
Fig. 6.
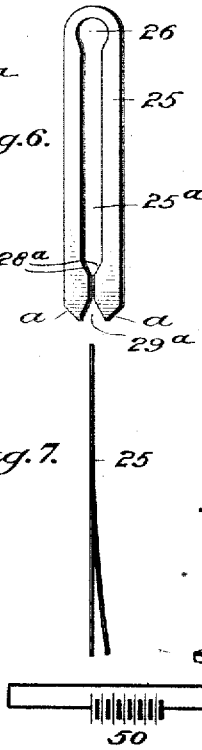
Fig. 7.
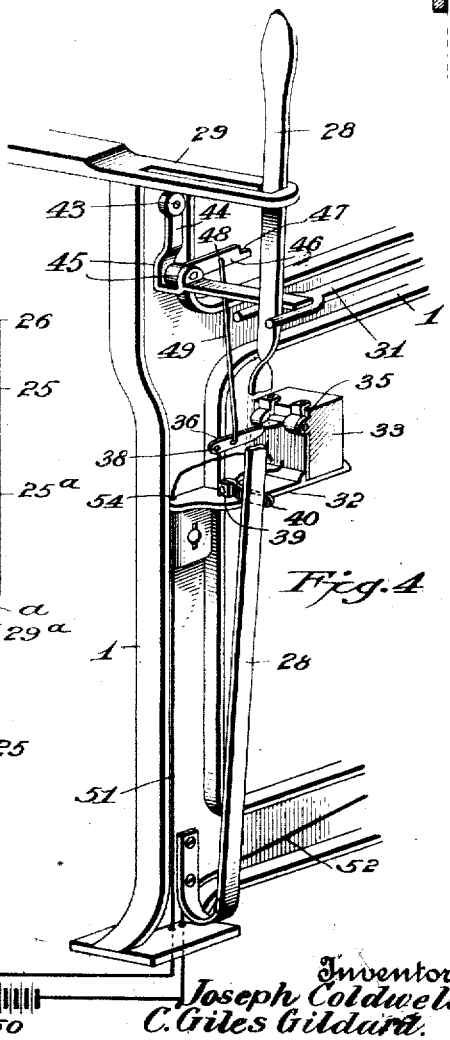
Fig. 4
Witnesses
G. S. Elliott.
Comer S. Beall
Inventors
Joseph Coldwell &
C. Giles Gildard.
by W. Duvall
Attorney.

UNITED STATES PATENT OFFICE.

JOSEPH COLDWELL AND CHRISTOPHER GILES GILDARD, OF FALL RIVER MASSACHUSETTS.

WARP STOP-MOTION FOR LOOMS.

SPECIFICATION forming part of Reissued Letters Patent No. 11,923, dated July 30, 1901.

Original No. 637,234, dated November 21, 1899. Application for reissue filed October 3, 1900. Serial No. 31,849.

*To all whom it may concern:*

Be it known that we, JOSEPH COLDWELL and CHRISTOPHER GILES GILDARD, citizens of the United States, residing at Fall River, in the county of Bristol and State of Massachusetts, have invented certain new and useful Improvements in Warp Stop-Motions for Looms; and we do hereby declare the following to be a full, clear, and exact description of the invention, such as will enable others skilled in the art to which it appertains to make and use the same.

Our invention relates to improvements in stop-motions for looms, and particularly to that class wherein an electrical current is employed for setting the stop-motion and is established by the breaking of one or more warp-threads. The numerous advantages arising from the use of the electrical current and magnet controlled thereby for this purpose have long been recognized, in that the delicate mechanism otherwise employed running contemporaneously with the loom was constantly wearing and giving out or breaking down, so that as a whole such mechanism was more of a hindrance and annoyance to the operatives or weavers, and by their frequent stopping for repairs greatly reduced the capacity of both the weavers and the looms.

The main objects of our invention are to produce a simple and economic stop mechanism capable of being applied to any of the ordinary looms by the usually-employed loom-fixer, which mechanism is operated or set for operation by the establishment of an electrical current, the circuit of which is normally broken and only established at the breaking of a warp-thread, which may be immediately cut out from the loom when not in use and this, too, automatically and simultaneously with the stoppage of the loom, thus effecting a saving of the batteries or other source of electrical supply, and, finally, which is durable and arranged entirely out of the way of the weavers.

Other objects and advantages of the invention will hereinafter appear, and the novel features of our invention will be particularly pointed out in the appended claims.

Referring to the drawings, Figure 1 is a side elevation of a portion of the loom-frame, showing so much of the loom as is necessary in order to fully illustrate our invention in its application. Fig. 2 is a partial plan view of one of the side frames of the loom, showing our invention in part. Fig. 3 is a longitudinal sectional view in detail of a portion of the invention comprising the lease-rods, circuit-rods, contact-roll, &c., together with their supports. Fig. 4 is a perspective view of a portion of the loom-frame, showing the shipper and our invention applied and adapted to operate thereon. Fig. 5 is a transverse sectional view on line 5 5, Fig. 3. Figs. 6 and 7 show side and edge elevations of our improved form of drop-bar or detector.

It will be understood that our invention may, as will be hereinafter apparent, be applied to looms having any usual driving mechanism having fast and loose pulleys, from one or the other of which a belt will be carried when it is desired to stop or start the loom, or the drive-pulleys may be of the variety known as "clutch" or "friction" pulleys.

Whatever form of driving-pulley is employed for the loom, such will be under the control of its own proper form of device to effect the stopping of the crank-shaft at the proper time; but with all varieties of pulleys there must be some style of shipper handle or lever under the control of the operator to stop and start the loom, and it is in connection with this that our invention is employed and adapted to operate automatically upon the instant that a warp-thread breaks.

In illustrating our invention we have in Fig. 1 shown so much of an ordinary loom-frame as is deemed necessary in order to illustrate the application thereof, it being understood that otherwise the loom consists of any usual well-known construction.

Between the side frames 1 of the loom we locate a pair of angular brackets 2, the lower ends or feet of which are longitudinally slotted, as at 3, to receive the bolts 4, that pass through the said slots and side frames 1 and through the medium of which the brackets and parts carried thereby may be held in any vertically-adjusted position to adapt the loom for various styles of weaving. One of the bolts 4—the one at that side of the loom at which the shipper is located—may be longitudinally bored, as indicated at 5, for a purpose hereinafter referred to.

At or about their middles the brackets 2 may be longitudinally slotted, as at 6, and through the medium of adjusting-bolts 6ª, passed therethrough, a pair of L-shaped bearing-brackets 7 may be supported. The upper ends of these bearing-brackets 7 may be U-shaped, as at 8, and each may contain similar-shaped bushings 9, of any suitable insulating material.

The bushings 9 receive the axial ends of a loose rotatable contact-roller 10, made of metal, (preferably of copper,) and one of said axial bearings is provided with a collar 11, having an electrical binding-post 12, located immediately above a hole 13, formed in the foot of the L-shaped bearing-bracket 7. Screws 14 may be passed upwardly through the lower horizontal ends of the L-shaped bearing-brackets 7, and supported thereby may be a horizontally-disposed wiper-bar 15, the same being located immediately under and in contact with the metallic contact-roller 10. This wiper-bar may have its upper face concaved longitudinally to conform to the roller 10 and have a textile wiping-surface 16 in contact with the roller, so that by turning the roller 10 by hand or otherwise all lint or other foreign deposit is wiped from its surface by the wiper-bar, and therefore electrical contact can at all times be most readily established between the contact-roller and certain other devices hereinafter referred to. The collar 11 being loose on the axial bearing of the roller 10, it will be seen that the turning of the roller will not in the least disturb the relative location between the binding-post 12, carried by the collar, and the hole 13 in the bracket.

The two brackets 2 terminate above the contact-roller 10 in pairs of inwardly and horizontally disposed lugs or ears 17, which may be longitudinally slotted, as at 18, and between which are located flat parallel circuit-rods 19, spaced a suitable distance apart and preferably inclined toward each other at their upper edges. Bolts 20 pass through the circuit rods and slots 18 and serve to secure the former in position within the brackets 17.

To the upper angular ends of the brackets 2 is adjustably secured, by bolts 21, a pair of inverted-L-shaped brackets 22, the same having their lower ends slotted, as at 23, to receive the bolts 21. The inner horizontal ends of these brackets are T-shaped, and the ends of the same are connected by screws to the ends of a pair of parallel lease-rods 24, which are preferably hollow or tubular to lend lightness and are supported in the manner indicated. The lease-rods are located above and just outside of the vertical planes of the circuit-rods 19, and over and under said lease-rods the warp-threads are alternately passed in the usual manner.

At this point it might be well to describe specifically the contact drop-bars as improved by us and which are indicated as 25. It will be understood that while we contemplate the use of our improved form of drop-bar, for reasons hereinafter apparent, yet we can employ any other form of drop-bar if for any reason we should desire so to do.

Our improved drop-bar 25 is made (stamped, preferably) from a blank of thin flexible sheet metal and has a general oblong shape. The same has formed within its area a longitudinal slot 25ª, which approximates in width that of the circuit-rods 19, but is sufficiently wider to permit an easy fit thereover. The upper end of the slot 25ª may terminate in an enlarged eye 26, designed to loosely straddle the warp-thread. The opposite or lower end of the slot 25ª somewhat gradually merges into a narrow slit or throat 27, after which the edges diverge at or near the lower ends of the terminals. This produces at the upper end of the slit or throat 27 opposite internal stop-shoulders 28ª and at the lower end a flared mouth or entrance 29ª, the ends of the drop-bar being beveled at *a*. The warp-threads being in position over and under the lease-rods, each has suspended thereon a drop-bar, such as we have described or of any other desired shape, those of the construction described having their lower split ends sprung laterally past each other and slipped or dropped into position simultaneously upon a warp-thread and upon an adjacent circuit-rod. It will be obvious that the engagement of the circuit-rods will prevent the drop-bars from being dragged from their proper position by the travel of the warp-threads, and, furthermore, that the shoulders 28ª, engaging under the circuit-rods, will prevent them from being thrown from their position on the threads. At the same time the shape and flexibility of the drop-bars are such as will permit them to be simultaneously removed or replaced upon the warp-threads and circuit-rod by simply giving the two terminals of each drop-bar a slight lateral twist in opposite directions. It will also be noticed that, owing to the location of the lease-rods with reference to the drop-bars and to the shape which we give these drop-bars, each drop-bar is entirely free from contact with the warp-threads on either side of its own warp-thread and can only come in contact with them (if at all) by jumping upward while the loom is in motion. By this arrangement we prevent the injurious chafing of the warp-threads which takes place where each thread passes by the drop-bars of the two adjacent threads and is normally in contact with one or both of these drop-bars. It will be understood that the electrical current is made and broken by contact between any one or more of the aforesaid drop-bars 25 and the contact-roller 10, the said drop-bars being normally suspended out of such contact and the circuit therefore broken or incomplete by the tension of the warp-threads. In the event that one of said threads should break the drop-bar supported thereby will fall, being guided in its movement by the circuit-rod 19, so that the same will pass to one side of the center of said roller, the edge of said drop-bar falling against the latter. This movement is aided by the beveled ends *a* of the drop-bars, which cause the latter to glance upon contacting with the surface of the roller.

28 designates the usual shipper, formed of spring metal, as in the ordinary construction of loom, and 29 the usual notched plate by which it is guided and also locked in position to set the loom in motion through the medium of the belt-shifter 30 and its operating-lever 31, the latter being forked to loosely engage the shipper.

A bracket 32 is bolted to the side frame 1 at the inner side of the shipper and the same supports in this out-of-the-way position a magnet box or case 33, in which is located an electromagnet 34. In the upper front corner of the box or case 33 in suitable bearings 35, provided for the purpose, is pivoted an armature-lever 36, the inner end of which supports an armature 37 and the outer portion of which may have a series of small holes 38. In front of the magnet box or case may be located a stud 39, having a contact-spring 40 extending laterally therefrom and lying in such position with relation to the shipper as to be in electrical contact therewith when said shipper is thrown outward into the locking-notch of the guide-plate, and therefore the loom set in operation. When in this position, it will be possible for the drop-bars to complete the electrical circuit by dropping into contact with the metallic contact-roller 10; but when the shipper is at the inner end of the slot in the guide-plate the contact of the drop-bars with the metallic contact-roller 10 is without effect. Thus it is obvious that setting the loom in operation serves also and without further operation to set the stop-motion in working condition, and stopping the loom throws or cuts out the stop-motion, both the throwing in and throwing out of such stop-motion being automatically accomplished by the starting and stopping of the loom through the shipper.

On the stud 39 is a binding-post 41, and leading therefrom to the pole in the magnet is an insulated circuit-wire 42.

Loosely hung, and therefore adapted to swing, on a stud-bolt 43, that projects horizontally from the side frame 1 immediately below the guide-plate, is an L-shaped knock-off 44, the lower horizontal end of which projects laterally to a point opposite and behind the shipper when the latter is in its operative position—namely, in engagement with the notch in the guide-plate—and has formed upon its upper side a pair of studs 45, in which is pivoted a rearwardly-disposed gravity-latch 46, the free end of which may be notched or shouldered, as at 47. This latch has a small hole 48, and a light wire rod 49 is connected to the same and to a convenient one of the perforations in the armature-lever, so that there is a unity of motion between the latch and armature-lever, which is directed by the latter. It will be obvious that if the magnet attracts the armature, as when the circuit is completed or established, the armature-lever will rise at its outer end and cause a similar movement upon the part of the latch, which thus being elevated into the path of the lay is struck thereby on its forward movement and, together with the knock-off, is forced forward, so that the latter striking the shipper disengages the same from the notch in the guide-plate, permitting the shipper to immediately swing inward and in doing so break contact with the contact-spring and operate the belt-shifter to stop the loom.

The battery 50 or other source of electrical energy may be conveniently located, preferably below the floor, and from one of its poles may lead the insulated circuit-wire 51 and from the other the insulated circuit-wire 52. Both wires lie between the flanges of the frame 1 and are supported where necessary, as in changes of direction, by suitable eyes 53. The wire 51 passes to the magnet and in doing so passes between the frame 1 and magnet-box-supporting bracket, which latter may be grooved on its inner vertical face or side, as indicated at 54, to accommodate the wire. The remaining circuit-wire 52 passes through the aforesaid guide-eyes 53, by which it is conducted to the outer end of the tubular bolt 5, through which it is passed, and thus saved from being passed around the frame and exposed. From the inner end of the bolt 5 the wire may be passed through a guide-eye 53, depending from the under side of the adjacent bracket 2, (by which it is made to conform to the shape of the bracket,) through a groove 55, formed in the angle of the bracket, and is finally secured to the binding-post 12 of the collar 11, mounted loosely on the metallic contact-roll. Tracing the circuit, it will be seen that when one or more drop-bars fall and contact with the roller 10 the electrical current, starting from one pole of the battery or other source of electrical supply, passes through wire 51 to the magnet, through the armature and magnet to the short wire leading to the spring-contact, thence through the shipper into the side frame 1, to the bracket 2, to the circuit-rods, down through the fallen drop bar or bars to the contact-roller 10, to the collar 11, binding-post 12, to the wire 52, and back to the battery or other source.

It will be apparent that the invention when applied to a loom requires practically no attention, an occasional turning of the contact-roll to free the same from dust and lint being sufficient, and that no leakage of electricity can occur by a relaxation of the tension of the warp-threads when the machine is not in operation, as in such instances the electrical arrangement is entirely cut out.

Having thus fully described our invention, what we claim is—

1. As an article of manufacture, a drop-bar formed of sheet metal and having a longitudinal slot provided with lower shoulders and terminating in a narrow slit or throat, the lower portion of the latter being flared, as set forth.

2. As an article of manufacture, the herein-described flexible sheet-metal drop-bar having a longitudinal slot, said slot at its upper end terminating in an enlarged eye, and at its lower end reduced to form a narrow slit or throat, the opposite edges of which, above the slit, are provided with stop-shoulders, and at their lower ends diverged to form a flared mouth, substantially as set forth.

3. An electrically-operated stop-motion for looms, comprising a drop-bar formed of flexible metal and having a longitudinal slot, the lower end of the slot being reduced to form opposite internal shoulders, and below the same a narrow slit or throat of less width than said slot, said drop-bar being normally supported by a warp-thread passing through said slot, a lower contact device, and a circuit-rod arranged to guide said drop-bar in its movement toward said contact device, substantially as set forth.

4. An electrically-operated stop-motion for looms comprising longitudinally-arranged approximately parallel electrical circuit-rods, a lower intermediate metallic electrical conductor, and opposite series of drop-bars loosely embracing said circuit-rods and adapted to be normally supported out of contact with said electrical conductor by the warp-threads of the loom, said circuit-rods serving to guide said drop-bars in their movement toward said conductor, substantially as set forth.

5. In an electrically-operated stop-motion for looms, the combination of a pair of flat electrical parallel circuit-rods, a lower rotatable contact device also in circuit, and opposite series of drop-bars straddling their respective circuit-rods normally supported out of contact with said contact device by the warp-threads of the loom, said drop-bars having lower beveled ends.

6. An electrically-operated stop-motion for looms comprising a pair of flat parallel circuit-rods converged toward their upper edges, a lower intermediate circuit contact-roller, and opposite pairs of drop-bars straddling the circuit-rods and arranged to be guided thereby, said drop-bars being normally supported out of contact with said contact-roller by the warp-threads of the loom, substantially as set forth.

7. In an electrically-operated stop-motion for looms, the combination with an electrical circuit-rod, and a lower contact-roller also in circuit, of the herein-described improved drop-bar formed of thin, flexible metal, and having a longitudinal slot loosely receiving said circuit-rod and terminating at its upper end in an enlarged eye, and at its lower end in a narrow slit or throat, which is flared at its lower extremity and provided at its upper end with internal stop-shoulders, said bar being normally held out of contact with said roller by the warp-threads passing through said eye, substantially as set forth.

8. An electrically-operated stop-motion for looms comprising an electrical circuit-rod, drop-bars having parallel arms loosely embracing the same, a loose roller therebelow in the path of said drop-bars, and also in circuit, and a wiping-bar parallel with said roller and arranged to contact with the latter, as set forth.

9. An electrically-operated stop-motion for looms comprising a supporting-bracket, an electrical circuit-rod supported by said bracket, drop-bars loosely embracing the same, a second bracket adjustably supported by said former bracket and having bushings, a loose roller mounted in said bushings and located in the path of said drop-bars, said roller being also in circuit, and a wiping-bar arranged parallel to and in contact with said roller and against which the latter may be rotated, substantially as set forth.

10. An electrically-operated stop-motion for looms, comprising a supporting-bracket having opposite ears or lugs, circuit-rods supported by said ears or lugs, a second bracket adjustably supported by said former bracket, a contact device mounted in said second bracket, and drop-bars loosely embracing said circuit-rods and adapted to be guided by the latter, substantially as set forth.

11. An electrically-operated stop-motion for looms, comprising an electrical circuit-rod, drop-bars loosely embracing the same, a loose roller mounted therebelow in the path of said drop-bars and also in circuit, and a wiping-bar parallel and arranged to contact with said roller and against which said roller may be rotated, said bar having its contacting-surface longitudinally grooved or concaved to conform to the surface of the roller and provided with a textile covering, substantially as set forth.

12. An electrically-operated stop-motion for looms, comprising a supporting-bracket, a pair of parallel circuit-rods supported thereby, a lower contact device also in circuit and supported by said bracket, adjustable brackets secured to said former bracket, a pair of lease-rods supported by said latter bracket and arranged over and at opposite sides of said circuit-rods, drop-bars having parallel arms straddling the circuit-rods and designed to contact with said contact device, said circuit-rods also serving as guides for said drop-bars, the warp-threads being passed alternately under and over the lease-rods and through the said drop-bars, whereby the latter are held suspended out of contact with the said contact device, substantially as set forth.

13. An electrical stop-motion for looms comprising a loom frame arranged in circuit, a pair of opposite brackets embraced by the sides of the frame, a contact-roller loosely mounted in the brackets, a pair of parallel circuit-rods arranged above the contact-roller in the brackets, overlanging brackets adjustably supported by said former brackets, a pair of lease-rods arranged above the circuit-rods and supported by said latter brackets, drop-bars loosely straddling the circuit-rods and supported out of contact with the contact-roller by the warp-threads about the lease-rods, and an electrical conductor leading from the said contact-roller, substantially as set forth.

14. In an electrically-operated stop-motion for looms, the combination with the loom-frame, electrical circuit-rods there below, and drop-bars supported on said circuit-rods and adapted to be suspended by the warp-threads, of a contact-roller located below the circuit-rods and adapted to rotate, a collar loosely mounted on the roller and provided with a binding-post, and electrical wires leading to the loom-frame and to the contact-roller, substantially as set forth.

15. In an electrically-operated stop-motion for looms, the combination with the loom-frame, a pair of brackets supported therebetween, and a pair of bolts for securing the two together, one of said bolts being bored, of a pair of bearings supported within the brackets and provided with insulated bushings, a contact-roller having its axis rotatably mounted in the bushings, a collar mounted loosely on one of said axes and provided with a binding-post, a circuit-wire leading therefrom and through suitable guides into and through the bored bolt, and to the source of electrical supply, a circuit-wire leading to the frame, a pair of circuit-rods connected electrically with and supported in the frame, and a series of drop-bars loosely embracing the circuit-rods and normally held out of contact with the contact-roller by the warp-thread of the loom, substantially as set forth.

16. In an electrically-operated stop-motion for looms, the combination with the sides of the loom, angular brackets, and bolts for securing the same to said sides, journal-brackets having insulations, a contact-roller journaled in said brackets, a contact-collar carried by said roller having a binding-post, and an electric wire leading therefrom, of a wiping bar, means for supporting the same, lugs extending from the upper ends of said brackets, circuit-rods connected thereto, inverted-L-shaped brackets also secured to said former brackets, lease-rods carried thereby, drop-bars mounted loosely on said circuit-rods and adapted to be supported by the warp-threads arranged upon the lease-rods, and a circuit-wire leading to the frame, substantially as set forth.

17. The combination with a loom employing a lay, a shipper, a magnet supported adjacent thereto and having an armature-lever, a circuit-wire leading from a source of supply to the magnet, and a contact-spring electrically connected to the magnet and arranged to engage the shipper when the latter is in the locked position, of a swinging approximately L-shaped knocker device supported in front of said shipper and having one of its arms extending opposite the latter, a latch pivoted to said arm and normally out of the path of said lay, a connection between said latch and armature-lever, whereby the raising of said lever causes a raising of the latch into the path of said lay, a contact device arranged in the loom below the path traveled by the warp-threads and in electrical circuit with the magnet through the frame of the loom when the shipper is swung into operative position and therefore in contact with the aforesaid contact-spring, a series of drop-bars normally supported out of contact with said contact device by the warp-threads, and electrical conductors leading from the electrical supply to the aforesaid drop-bars, substantially as set forth.

18. The combination with a loom employing a lay and a shipper, of a magnet supported adjacent to and in rear of said shipper and having an armature-lever, a circuit-wire leading from a source of electrical supply to the said magnet, a contact-spring electrically connected to the magnet and arranged to engage said shipper when the same is in its locked and operative position, a swinging L-shaped bracket pivotally connected to the loom-frame and extending laterally into the path of the said shipper, a latch pivotally mounted on said bracket above said armature-lever and normally out of the path of said lay, a rod connecting said latch with said armature-lever, whereby a raising of the latter serves to raise the former, a contact device arranged in the loom below the travel of the warp-threads and in electrical circuit with the magnet when the shipper is in contact with the contact-spring, a series of drop-bars normally supported out of contact with said contact device by the warp-threads, and parallel electrical conductors leading from the electrical supply to said drop-bars and designed to guide the latter, substantially as set forth.

19. A loom, having, in combination, a plurality of banks of drop-bars, each drop-bar being suspended from a single warp-thread and capable of free movement transversely of the warp-threads, and means for disposing the warp-threads so that each thread is normally out of contact with the drop-bars suspended from the two adjacent threads, whereby chafing of the threads is avoided.

20. A loom, having, in combination, means for disposing warp-thread sections in different planes, and a bank of drop-bars for each section, each drop-bar being suspended from a warp-thread and capable of free movement transversely of the warp-threads, and so shaped that the drop-bars of each bank are normally out of contact with the threads whereon are suspended the drop-bars of the other bank or banks, whereby chafing of the threads is avoided.

21. A loom, having, in combination, means for dividing a series of warp-threads into sections disposed in different planes, and drop-bars arranged in a plurality of banks, each drop-bar being suspended from a warp-thread and capable of free movement transversely of the warp-threads, and being so shaped that each thread is normally out of contact with the drop-bars suspended from the two adjacent threads, whereby chafing of the threads is avoided.

22. A loom, having, in combination, a plurality of banks of drop-bars, each drop-bar being suspended from a warp-thread and capable of free movement transversely of the warp-threads, leasing mechanism which disposes the warp-threads into sections in different planes, and drop-bars so shaped that the drop-bars of each bank are normally out of contact with the threads whereon are suspended the drop-bars of the other bank or banks, whereby chafing of the thread is avoided.

23. A loom, having, in combination, means which divide the warp-threads into intersecting planes, guides located beneath the warp-threads on opposite sides of the intersection between said planes and out of vertical alinement with said dividing means, and a drop-bar for each warp-thread, said drop-bars being arranged in banks positioned respectively by said guides, and suspended respectively from said warp-threads on opposite sides of said intersection, each drop-bar terminating at its upper end below the plane of the warp-threads which is intersected by the thread from which said drop-bar is suspended, whereby each drop-bar comes in contact only with the warp-thread which supports it, and is free to move vertically.

24. A loom, having, in combination, means which cause sections of the warp-threads to cross each other, and a drop-bar for each warp-thread suspended from its warp-thread at a point where said thread passes below said crossing and capable of free movement transversely of the warp-threads, each drop-bar terminating at its upper end below the plane of the warp-threads which is intersected by the thread from which said drop-bar is suspended, said drop-bar dropping away from all of the warp-threads on the occurrence of a fault in its thread.

25. A loom, having, in combination, means which cause sections of the warp-threads to cross each other, and a detector for each warp-thread which engages its thread at a point on one side of said crossing, being located relatively to said means for causing said crossing so as to have free vertical movement, extending from said point away from all of the warp-threads, and adapted and arranged to move away from all of said threads upon the occurrence of a fault in its own thread, each section of warp-threads passing beyond and out of contact with the ends of those drop-bars which engage the warp-threads of another section.

26. A loom, having, in combination, lease-rods which dispose the warp-thread sections in different intersecting planes, guides located beneath the warp-threads on opposite sides of the intersection between said planes and a thin drop-bar for each warp-thread, said drop-bars being arranged in banks positioned respectively by said guides, and suspended on opposite sides of said intersection and capable of free movement transversely of the warp-threads, whereby each drop-bar where its thread passes through it occupies a plane substantially parallel to the path of its thread, each drop-bar terminating at its upper end below the plane of the warp-threads which is intersected by the thread from which said drop-bar is suspended, whereby each drop-bar comes in contact only with the warp-thread which supports it.

27. A loom, having, in combination, a plurality of banks of drop-bars, each drop-bar being suspended from a single warp-thread and capable of free vertical movement, and means for disposing the warp-threads so that each thread is normally out of contact with the drop-bars suspended from the two adjacent threads, whereby chafing of the threads is avoided.

28. A loom, having, in combination, means for disposing warp-thread sections in different planes, and a bank of drop-bars for each section, each drop-bar being suspended from a warp-thread and capable of free vertical movement, and so shaped that the drop-bars of each bank are normally out of contact with the threads whereon are suspended the drop-bars of the other bank or banks, whereby chafing of the threads is avoided.

29. A loom, having, in combination, a plurality of banks of drop-bars, each drop-bar being suspended from a single warp-thread and capable of free movement vertically and transversely of the warp-threads, and means for disposing the warp-threads so that each thread is normally out of contact with the drop-bars suspended from the two adjacent threads, whereby chafing of the threads is avoided.

30. A loom, having, in combination, means for disposing warp-thread sections in different planes, and a bank of drop-bars for each section, each drop-bar being suspended from a warp-thread and capable of free movement vertically and transversely of the warp-threads, and so shaped that the drop-bars of each bank are normally out of contact with the threads whereon are suspended the drop-bars of the other bank or banks, whereby chafing of the threads is avoided.

In testimony whereof we have signed our names to this specification in the presence of two subscribing witnesses.

JOSEPH COLDWELL.
CHRISTOPHER GILES GILDARD.

Witnesses:
ARTHUR C. COGGESHALL,
THOMAS SIRVIS.

Disclaimers in Reissue Letters Patent No. 11,923.

DISCLAIMER.

11,923. (Reissue.)—*Joseph Coldwell* and *Christopher Giles Gildard*, Fall River, Mass. WARP STOP-MOTION FOR LOOMS. Patent dated July 30, 1901. Disclaimers filed August 2, 1913, by the assignee, *The Coldwell Gildard Co.*, and the licensees, *Crompton & Knowles Loom Works* and *Draper Company*.

Enter their disclaimers, each to the extent of its interest in said Letters Patent—"To claims 19, 20, 21, 22, 24, 27, 28, 29, and 30."

[OFFICIAL GAZETTE, *August 12, 1913.*]

DISCLAIMER.

11,923. (Reissue.)—*Joseph Coldwell* and *Christopher Giles Gildard*, Fall River, Mass. WARP STOP-MOTION FOR LOOMS. Patent dated July 30, 1901. Disclaimers filed January 19, 1915, by the assignee, *The Coldwell-Gildard Co.*, and the licensees, *Crompton & Knowles Loom Works* and *Draper Company*.

Enter their disclaimers, each to the extent of its interest in said Letters Patent, to claim 25.

[*Official Gazette, January 26, 1915.*]